US008664147B2

(12) United States Patent
Bello et al.

(10) Patent No.: US 8,664,147 B2
(45) Date of Patent: Mar. 4, 2014

(54) METHOD FOR PREPARATION OF BIMETALLIC COMPOSITIONS OF COBALT AND PALLADIUM ON AN INERT MATERIAL SUPPORT AND COMPOSITIONS OBTAINABLE BY THE SAME

(75) Inventors: Valentina Bello, Padua (IT); Helmut Boen-Nemann, Essen (DE); Paolo Canu, Trescore Balneario (IT); Massimo Centazzo, Camisano Vicentino (IT); Luca Conte, Pederobba (IT); Daniela Dalle Nogare, Este (IT); Giovanni Mattei, Padua (IT); Renzo Rosei, Trieste (IT)

(73) Assignee: QID S.R.L., Vicenza (IT)

( * ) Notice: Subject to any disclaimer, the term of this patent is extended or adjusted under 35 U.S.C. 154(b) by 0 days.

(21) Appl. No.: 13/519,698

(22) PCT Filed: Dec. 28, 2010

(86) PCT No.: PCT/EP2010/070806
§ 371 (c)(1),
(2), (4) Date: Jun. 28, 2012

(87) PCT Pub. No.: WO2011/080275
PCT Pub. Date: Jul. 7, 2011

(65) Prior Publication Data
US 2012/0288430 A1   Nov. 15, 2012

(30) Foreign Application Priority Data
Dec. 29, 2009   (IT) .............................. PD2009A0397

(51) Int. Cl.
*B01J 23/40* (2006.01)

(52) U.S. Cl.
USPC ............... 502/326; 502/304; 502/74; 502/73; 502/327; 502/260; 423/247

(58) Field of Classification Search
USPC ........ 423/247; 502/304, 73, 327, 74, 66, 260, 502/326
See application file for complete search history.

(56) References Cited

U.S. PATENT DOCUMENTS

2007/0092768 A1   4/2007  Lee

FOREIGN PATENT DOCUMENTS

| WO | WO 2006/045606 | 5/2006 |
| WO | WO 2006045606 A1 * | 5/2006 |
| WO | WO 2006/090190 | 8/2006 |

OTHER PUBLICATIONS

Hulteberg PC et al., 2005, "Preferential oxidation of carbon monoxide on mounted and unmounted noble-metal catalysts in hydrogen-rich streams" International Journal of Hydrogen Energy, 30(11):1235-1242.

* cited by examiner

*Primary Examiner* — Colleen Dunn
*Assistant Examiner* — Haytham Soliman
(74) *Attorney, Agent, or Firm* — DLA Piper LLP (US)

(57) ABSTRACT

This invention concerns a procedure for the formation of a bimetallic composition by means of the subsequent depositing of Co(0) and Pd(0) on an inert support, a composition obtained by means of said procedure and the use of said bimetallic composition as a catalyst. Another aspect of this invention is a catalytic device that includes said bimetallic composition.

12 Claims, 5 Drawing Sheets

US 8,664,147 B2

METHOD FOR PREPARATION OF BIMETALLIC COMPOSITIONS OF COBALT AND PALLADIUM ON AN INERT MATERIAL SUPPORT AND COMPOSITIONS OBTAINABLE BY THE SAME

RELATED APPLICATIONS

This application is a national stage entry of International Application No. PCT/EP2010/070806 filed on Dec. 28, 2010, which claims the benefit of Italian Patent Application No. PD2009A000397 filed on Dec. 29, 2009, which is hereby incorporated by reference herein in its entirety.

FIELD OF THE INVENTION

This invention concerns a method for the preparation of a bimetallic composition by means of deposition of Co(0) on an inert material and a subsequent Pd(0) deposition on the composition obtained from the first Co(0) deposition, a composition obtainable by means of said method and the use of said Pd:Co bimetallic composition supported on an inert material as a catalyst. The invention further relates to a catalytic device comprising said Pd:Co@inert material composition as catalyst.

BACKGROUND OF THE INVENTION

Hydrogen is an essential element for a number of chemical reactions for synthesis at industrial level. It is used, for example, in large quantities for ammonia synthesis (from which all nitrogenous fertilisers are, then, obtained) and in petroleum manufacturing. Some important processes require, furthermore, that the hydrogen is in an ultrapure form (and, in particular, that it does not contain any carbon monoxide, except in traces of less than 10 ppm). Ultrapure hydrogen is, for example, used as missile fuel, for the production of semiconductor chips and in the metallurgy industry. Furthermore, a considerable use of ultrapure hydrogen has also been foreseen in connection with the widespread use of Polymeric Membrane Fuel Cells (whose catalyst, based on platinum, is made ineffective by impurities, even at minimum levels, present in the feed gas).

Therefore, for a vast range of uses, it is necessary to purify the hydrogen by means of the carbon monoxide selective catalytic oxidation reaction ("PROX" reaction). This reaction requires particular attentions because CO oxidation takes place in the presence of a very high concentration of hydrogen, and the catalyst must be particularly active in removing the carbon monoxide, avoiding, however, in the meantime, hydrogen consumption.

Platinum nanoparticles anchored on an inert support material (such as oxides of aluminium, silicon, titanium or cerium) are generally used as catalysts for said reactions. These catalysts have, however, the disadvantages of the high cost of precious metal, of a relatively high working temperature and of a reduced efficiency (because of the limited selectivity).

Some alternative catalysts have, recently, been developed based on platinum and ruthenium for PROX reaction (S. Alayoglu, B. Eichhorn, *Journal of American Chemical Society*, 2008, 130, 17479) and based on platinum and cobalt for fuel cells (H. Schulenburg et al., *Journal of Physical Chemistry C*, 2009, 113, 4069-4077). Said catalysts provide better performances, but they still have the drawback of the high cost due to the use (even if only partial) of platinum in their composition. Furthermore, in the preparation process of such catalysts the Pt component is obtained by using a Pt organometallic precursor, which is very expensive and difficult to handle for the manufacturing chemical industry. Accordingly, there is the need to develop an efficient catalyst for the PROX reaction, which combines a good efficiency with a reduction in costs, compared to the state-of-the-art catalysts currently available. In addition, the catalysts that present high activity and selectivity in the carbon monoxide oxidation process have also proven to be catalytic elements active in the anodic and cathodic reactions of polymeric fuel cells as well as in the "Water Gas Shift" reaction, in which the carbon monoxide reacts with water in the vapour state, forming hydrogen and carbon dioxide, in particular, in small and medium-sized reactors.

SUMMARY OF THE INVENTION

The first purpose of the present invention is to provide a process for the preparation of an efficient catalyst and having reduced cost with reference to the compositions of the state-of-the-art currently known in the field of catalytic devices.

Another purpose of the invention is to provide a stable product, which can be used as an efficient catalyst in the field of catalytic devices, at a reduced cost compared to the state-of-the-art catalysts already known.

Another purpose of this invention is to provide an innovative catalyst, which is both efficient and cheaper compared to the state-of-the-art catalysts already known.

Another purpose is the realisation of a catalytic device, which has a higher degree of efficiency and duration compared to the state-of-the-art devices already known and at a lower cost.

These and other purposes have been achieved by means of a method for preparation of a bimetallic composition of cobalt and palladium supported on an inert material comprising at least the steps of:

reducing a cobalt compound and depositing the Co(0) metallic nanoparticle obtained on the surface of a particle consisting of an inert material, selected from aluminium oxide, titanium oxide, zirconium oxide, silicon oxide, cerium oxide and mixed cerium and zirconium oxides;

depositing Pd(0) on the Co(0) nanoparticle/inert material composition of matter obtained at the previous step; and conditioning the bimetallic composition of cobalt and palladium supported on an inert material obtained at the previous step.

Before the use as catalyst the Pd(0):Co(0) supported on inert material composition obtained can be further subjected to a catalytic activation.

The composition obtained by means of a process comprising said steps is particularly active in the preferential oxidation reactions of carbon monoxide in presence of hydrogen and is cheaper compared to platinum-based catalysts, thanks both to the use of palladium as well as the reduced quantities of precious metal required for the catalytic activities. The composition obtained by means of a procedure comprising said steps is, furthermore, suitable for "Water-Gas Shift Reaction", for non-preferential oxidation of CO to $CO_2$ and for oxi-reductions occurring in fuel cells.

Therefore, in a first aspect it is an object of the invention the method for the preparation of a bimetallic composition of cobalt and palladium supported on an inert material previously outlined.

In a further aspect it is an object of the invention compositions of Pd:Co bimetallic nanoparticles supported on an inert material obtainable by means of said method of preparation.

Yet, in another aspects objects of the invention are the use of the said compositions of Pd:Co supported on an inert material as heterogeneous catalysts and catalytic devices making use of said compositions as catalysts.

Characteristics and advantages of the present invention will be described in the following detailed description of possible, but not exclusive, embodiments of the method to prepare the bimetallic Pd:Co supported on inert material compositions according to the present invention. These embodiments are herein provided for illustrative purpose and then non-limiting.

DETAILED DESCRIPTION OF THE INVENTION

Definitions

Figure 1:
FIG. 1. the figure shows the mean diameter of the nanoparticles of Pd:Co@Al2O3 of example 1 obtained with the method of the invention (<D>04 with a standard deviation of the size distribution σ=1 nm).

Unless otherwise defined, all technical and scientific terms used in the whole description of the present invention have the same meanings as said terms are commonly understood by one of ordinary skill in the art to which this invention pertains.

Therefore, the terms "nanoparticle(s)" and "nanometric composition(s)" are herein used in their extended meanings and in particular they mean respectively particles or agglomerates of atoms and/or molecules, whose diameter is less than 100 nanometres, and compositions comprising said nanoparticles.

In whole the description the expressions "Pd and Co or Pd:Co bimetallic compositions" and "Pd and Co or Pd:Co supported on an inert material compositions" and other equivalent expressions are used for the compositions obtained with the method of preparation herein disclosed, that is a composition of matter wherein: nanoparticles of Co(0) are deposited on particles of inert material having the function of support; on the composition so obtained of Co(0) and inert material nanoparticles of Pd(0) are further deposited; and Pd(0):Co(0)/inert material composition obtained is conditioned.

In another option the compositions of matter obtained with the method of preparation according to the invention can be herein indicated by the currently in use representations:

Co@inert material support: the composition obtained at the first deposition of Co(0) nanoparticles on an inert support material particles and, in particular, when said inert material is $Al_2O_3$ the composition can be represented as Co@ $Al_2O_3$;

Pd:Co@inert material support: the composition obtained either at the second deposition of Pd(0) nanoparticles on Co@inert material support or after the step of conditioning. In particular, when said inert material is $Al_2O_3$ the composition can be represented as Pd:Co@ $Al_2O_3$.

Description

The inventors have surprisingly found that it is possible to increase the efficiency of catalytic devices, at the same time reducing their cost, using the Pd:Co bimetallic compositions obtainable by means of the method of preparation according to the invention.

Said method comprises the following steps in sequence:

reducing a Co compound and depositing the metallic cobalt (Co(0)) nanoparticle obtained on the surface of a particle consisting of an inert support of a material selected from aluminium oxide, titanium oxide and zirconium oxide, silicon oxide, cerium oxide and mixed cerium and zirconium oxides so obtaining a composition of matter representable as Co@inert material support;

depositing metallic palladium (Pd(0)) nanoparticles on the metallic cobalt nanoparticle supported on an inert material composition obtained at the previous step obtaining a composition of matter representable as Pd:Co@inert material support; and conditioning the Pd:Co@inert material support composition obtained, wherein the two first steps of Co and Pd metallic nanoparticle deposition are performed under argon flux and the third step of conditioning is performed under argon, hydrogen and argon fluxes on the dry powder consisting of the composition of Pd(0):Co(0) nanoparticles supported on an inert material obtained after deposition of Pd(0) nanoparticles.

In the following possible and preferred embodiments of the method of preparation of Pd:Co bimetallic compositions according to the invention are described in detail.

In a preferred embodiment of the method according to the invention, the first step consists essentially in a controlled formation of metallic Co nanoparticles by decomposition of a Co compound, where said compound is preferably $Co_2(CO)_8$, in presence of particles consisting of inert material so obtaining Co(0) nanoparticles of controlled size on the surface layer of the inert material particles. Said decomposition is performed by adding the Co compound selected to dry and argonated inert material particles (ratio by weight between Co and the metal of the inert material is at least 0.05 and preferably is comprised in the range from 0.05 to 0.20) in an organic solvent under stirring at room temperature and then by adding a chemical reducing agent selected from trialkyl-aluminium compounds $AlR_3$, where R is a $C_6$-$C_{20}$ alkyl linear or branched chain, and is preferably trioctyl aluminium (Al$(C_8H_{17})_3$), in presence of an inert material particles selected from the aforementioned ones, preferably aluminium oxide ($Al_2O_3$), to generate Co(0) nanoparticles "in-situ" absorbed by or onto the support material.

The quantity of said added trialkyl-aluminium compounds ($AlR_3$) is, preferably, such as the atomic ratio of the two metals, Co deriving from $Co_2(CO)_8$ and Al deriving from $AlR_3$ (Co:Al); is between 2 and 20. More preferably, the said quantity is such as the atomic ratio Co/Al is between 5 and 10.

Said decomposition is, preferably, be performed in an organic solvent selected from benzene, xylene, toluene and mixtures thereof. Said solvent is, more preferably, toluene.

Said decomposition and deposition are, preferably, performed at a temperature of between 80 e 180° C. for a time up to 20-24 hours. Said temperature is, even more preferably, 110° C.

During this step the stirring suspension gradually turned into dark green and finally a black-greyish powder is obtained. The powder is allowed to settle down for at least 1 hour and then the clear supernatant is carefully syphoned off. The powder is not subjected to any further treatment, such as for example drying.

In one of the preferred embodiment, before use in this step, the inert support can be calcined in air for 5 hours at 500° C., with an increasing T ramp of 5° C./minute, in order to increase its porosity. Furthermore, the particle size of the inert material can be preferably, if necessary, reduced. Said reduction of the inert material particle size is undertaken before or after calcination in air of inert support. Inert material, preferably, is reduced to a size between 20 nm and 500 nm, even more preferably between 50 nm and 150 nm by an ultrasound treatment for 24 hours of said material in organic solvents or mixtures thereof, preferably a mixture of toluene and n-octane. At the end the nanoparticles of the inert material are dried under high vacuum and treated with an argon flux. Preferably also this preparation of the inert material is performed in argon atmosphere.

The preferred technical features for the inert material are: surface area BET>100 $m^2/g$; total pore volume>0.8 $cm^3/g$; average pore diameter>200 Angstrom.

The most preferred inert material technical features are: surface area BET>130 $m^2/g$; total pore volume>0.9 $cm^3/g$; average pore diameter>230 Angstrom.

At the end of this step Co@inert material support composition nanoparticles having a minimum size of 1 nm and, preferably, have a minimum size of 2 nm. and a maximum size of 14-15 nm can be obtained.

As the second step is concerned, in one of the preferred invention embodiments, said step comprises the treatment of Co@inert material support obtained at the first step with a Pd(0) colloidal suspension previously prepared.

Said colloidal suspension is obtained by reduction of a Pd(II) compound having formula $PdR'_2$ where R' can be acetate or acetylacetonate group. Preferably, said compound is selected from palladium acetylacetonate ($Pd(acac)_2$), palladium acetate ($Pd(OAc)_2$ Said compound is, more preferably, palladium acetylacetonate ($Pd(acac)_2$).

Said reduction is, preferably, performed in the same conditions of reduction of Co, hence, by addition of a chemical agent selected from the trialkyl-aluminium ($AlR_3$) compounds usable for the first step. Even in this case said compound is, more preferably, trioctyl aluminium ($Al(C_8H_{17})_3$). The quantity of said added trialkyl-aluminium compounds ($AlR_3$) is, preferably, such as the atomic ratio Pd:Al is between 0.10 and 3.00. Even more preferably, said quantity is such as the atomic ratio Pd:Al is between 0.15 and 1.00. Said reduction is, preferably, performed in an organic solvent selected from toluene, benzene, xylene and mixtures thereof.

More preferably said solvent is toluene. Said palladium reduction, preferably, is performed at a temperature of between 20 and 200° C. More preferably, said temperature is between 25 and 100° C. and the most preferred temperature is between 25 and 30° C.

A organic solution of a $AlR_3$ compound is added drop-wise to a Pd(II) compound dispersed in organic solvent under stirring and the yellow suspension turned in a dark brown-black colloidal Pd(0) suspension.

The palladium (0) nanoparticles so obtained have a minimum size of 0.5 nm, preferably a minimum size of 1.0 nm, and a maximum size of 4.0 nm, preferably a maximum size of 3.0 nm.

For the Pd deposition step the Pd(0) nanoparticles suspended in an organic solvent, preferably toluene, are added to the powder of cobalt (0) nanoparticles Co@inert support obtained at the first step under stirring in an atmosphere consisting of argon for at least 3 hours. The quantity of the two metals used for this deposition step are in an atomic ratio Pd:Co comprised from 1:10 and 1:0.1 and preferably comprised in the range from 1:3 to 1:1. The organic solvent is then evaporated under high vacuum and the resulting dark brown powder is washed, preferably with acetone, and dried in vacuum.

The dry powder obtained is conditioned in a further third step, said step consists of treating Pd:Co@inert material support at a temperature of between 250 and 450° C. under a hydrogen flow for at least 1 hour. The hydrogen flow, is preceded and followed by an argon flow of 20 minutes. Said conditioning is, preferably, performed at 350° C. The hydrogen is, preferably, pure (solar grade) and, even more preferably, electronic grade. At this step a brown-greyish powder is obtained. Preferably, prior to any exposure to the air, the Pd:Co nanoparticles obtained at step of conditioning are treated with 3.5 vol % of $O_2$ in argon for 20 minutes at a temperature of between 20 and 30° C., then argonated and stored in argon atmosphere. This treatment produced a superficial oxidation capable to protect the metal layers for massive oxidation.

Furthermore, the method of the invention can also comprise before the use as catalyst of the Pd:Co@inert material support obtained at the third step to a catalytic activation. This step is an annealing of the material obtained after deposition of palladium in an atmosphere consisting in a mixture of hydrogen and argon. The temperature of this step, preferably, is between 500 and 1000° C. Even more preferably, the temperature is 800° C. Preferably, hydrogen is between 1 vol % and 20 vol % and argon is between 99 vol % and 80 vol %, even more preferably, hydrogen is 10 vol % and argon is 90 vol %. The treatment time is, preferably, between 1 hour and 6 hours. Even more preferably, said treatment time is 3 hours.

Therefore, in a preferred embodiment the method of preparation of compositions of Pd:Co nanoparticles supported on an inert material of the invention comprises the steps of:

optionally, calcinating and reducing the size of an inert material usable as support for said compositions;

reducing a Co compound and depositing the metallic cobalt (Co(0)) nanoparticle obtained by absorption on the surface of a particle consisting of an inert support of a material selected from aluminium oxide, titanium oxide and zirconium oxide, silicon oxide, cerium oxide and mixed cerium and zirconium oxides;

preparing metallic palladium (Pd(0)) nanoparticles by reducing a Pd(II) compound;

depositing metallic palladium (Pd(0)) nanoparticles on the Co@inert material support composition obtained at the first step; and conditioning the dry powder essentially consisting of the composition Pd:Co@inert material support;

optionally, stabilising by superficial oxidation the conditioned Pd:Co@inert material support composition previously obtained;

subjecting the conditioned Pd:Co@inert material support composition to a catalytic activation before the use either in catalytic process or for the preparation of catalytic device comprising thereof as catalyst.

In another aspect, the present invention concerns a Pd:Co supported on an inert material composition, which can be obtained by means of the method of preparation herein disclosed in detail.

According to the method of preparation of the invention, palladium (0) and cobalt(0) are present in the supported composition in specific proportions with atomic ratio Pd:Co comprised between 1:10 and 1:0.1. In a preferred embodiment the Pd:Co atomic ratio is between 1/3 and 1/1. These ratios can be obtained using appropriate quantity of Co compounds and Pd compounds at the different steps of the preparation of the compositions of the invention.

Therefore, the compositions of Pd:Co bimetallic nanoparticles supported on an inert material obtainable with the method of preparation herein disclosed are characterized by:
- a ratio by weight between Co(0) deposited and the metal of the inert material selected of at least 0.05 and preferably comprised from 0.05 to 0.2;
- an atomic ratio from Pd(0) and Co(0) comprised from 1 (Pd) and 10 (Co) and 1 (Pd) and 0.1 (Co) and preferably comprised from 1 (Pd) and 3 (Co) and 1 (Pd) and 1 (Co).

The Pd:Co bimetallic composition prepared according to the method of the invention typically can have a size comprised between 1 nm and 100 nm.

Preferably, said sizes are comprised between 2 nm and 15 nm. Even more preferably, said sizes are comprised between 3 nm and 6 nm.

In a further aspect, this invention concerns the use of the invention Pd:Co@inert material support bimetallic composition as a catalyst. Said composition can be, preferably, used as a catalyst for an oxi-reduction reaction, even more preferably after the composition activation step with heat treatment. Preferably, said oxi-reduction reactions are the Water Gas Shift Reaction (WGSR), the (preferential or non-preferential) oxidation of CO to $CO_2$ and oxi-reduction occurring in fuel cells. In one of the preferred use, said oxi-reduction reaction is the preferential oxidation (PROX) process of carbon monoxide to carbon dioxide with controlled quantities of oxygen in an atmosphere rich in hydrogen.

It is possible to combine the use of the Pd:Co bimetallic composition of the invention with the use of other catalysts or suitable compounds, for example to increase the global efficiency of the reaction, or of the series of anodic and cathodic reactions of fuel cells, or increase the global efficiency of the reaction of the series of oxy-reduction of catalytic exhaust mufflers.

In one of the preferred uses, the Pd:Co@inert material composition of the invention is used for the preferential oxidation process of CO to $CO_2$ with $O_2$ in an atmosphere rich in $H_2$, with the minimum oxidation of $H_2$, itself to $H_2O$. Said process is aimed at reducing the CO concentration in hydrogen until achieving the maximum value of 10 ppm and belongs to a more general $H_2$ purification process for applications in which pure hydrogen is requested.

From one aspect, this invention concerns a catalytic device that includes the Pd:Co@inert material composition of the invention as catalyst.

In one of the preferred realisation forms, said device is a catalyst consisting of macroscopic sized cordierite or ceramic material in a honeycomb shape, where the inert material containing the Pd:Co@inert material composition on the surface is deposited. Through said cordierite or ceramic material a gas flow, to be subjected to a desired reaction, is passed. Said cordierite or ceramic material can be impregnated with other known state-of-the-art processes.

In another preferred realisation form, said device is a fuel cell.

EXAMPLES

The following examples illustrate the invention Pd:Co@inert material composition advantages and properties, without any intention of limiting these realisation forms.

Example 1

Preparation of Composition 1, Metallic Content 1.8% of the Total Weight a) Reduction of the Size of the $Al_2O_3$ Particles 13 g of $Al_2O_3$ are suspended in a mixture of toluene (90 ml) and n-octane (10 ml) and treated with ultrasound for 24 ore. The treatment is, then, interrupted to allow the precipitation of $Al_2O_3$ in 4-5 hours, the supernatant is decanted and the residue dried at 80° C. under high vacuum for 18 hours and placed in an argon atmosphere. All the subsequent operations must be performed in an Ar atmosphere using the "Schlenk"-type techniques.

b) Synthesis of Co(0) Nanoparticles on $Al_2O_3$ Support (Co@$Al_2O_3$)

The $Al_2O_3$ obtained at step a), dried and under argon, is placed in a 250 ml three-necked flask equipped with a mechanical stirrer (not magnetic) and a reflux condenser. $Co_2(CO)_8$ (0.4 g) and toluene (150 ml) are added to the 13 g of $Al_2O_3$ and the mixture undergoes vigorous stirring for 2 hours. $Al(C_8H_{17})_3$ (0.12 ml) is, then, added to the reaction mixture at room temperature and the mixture is heated under constant reflux conditions for 20 hours at 110° C. under stirring. During the first hour the suspension gradually becomes dark green in colour and, at the end, a greyish-black powder is obtained. Afterwards, the particles obtained in this way are left to deposit (1 hour), then, the clear, supernatant solution is carefully removed without leading to dryness.

c) Synthesis of Pd(0) Nanoparticles Suspended in an Organic Solvent

In a 250 ml two-necked flask equipped with a dropping funnel $Pd(acac)_2$ (0.26 g) is suspended in toluene (50 ml). A suspension of $Al(C_8H_{17})_3$ (1.6 ml) in 20 ml of toluene is dropped into a suspension being vigorously stirred (it is possible to apply magnetic stirring). The yellow suspension is immediately transformed into a Pd(0) colloidal solution that is dark brown/black in colour.

d) Deposition of a Layer of Pd (0) on a Co Nucleus on an $Al_2O_3$ Support (Pd:Co@$Al_2O_3$)

The colloidal Pd(0) solution, obtained at step c), is added to the particles obtained at step b) and stirred for 3 hours, then the toluene is removed further to evaporation under high vacuum; in $Al_2O_3$ support there are 0.14 g of Co and 0.09 g of Pd.

The resulting, dark brown powder is washed with acetone (technical purity, 100 ml at a time) 3 times; acetone is added to the powder, stirred for 1 minute and, after the particulate precipitation, the brownish supernatant is sucked outside. The residue is vacuum dried in preparation for the conditioning step and subsequent heat treatment.

e) Conditioning of Pd:Co@$Al_2O_3$

The brown powder obtained at step d) is placed in a porcelain boat and placed at 350° C. in a pre-heated oven. Initially, the material is conditioned under an argon flow (20 min), then under a hydrogen flow (1 h), then, once again, under an argon flow (20 min).

At the end, the container with the sample is removed from the oven (still under the argon flow) and gradually cooled at a temperature of between 20-25° C.

After this treatment the sample is stabilised against oxidative corrosion in an argon flow that contains a small quantity of oxygen/argon (3.5 vol % $O_2$ in argon) for 20 min at a temperature of between 20-25° C. before exposure to the air. The sample is, then, removed from the container, under an argon flow, to a sealed container and sealed under argon (this operation can be performed in a glove box).

f) Catalytic Activation of the Pd:Co@$Al_2O_3$

The sample prepared at the previous step e) (3 g) is rapidly heated (10° C./min) at 800° C. in an inert atmosphere (argon). The sample is maintained at said temperature for 3 hours under a controlled atmosphere flow (180 ml/min with 90% argon and 10% hydrogen). After the heat treatment, the sample is slowly cooled in an inert atmosphere (argon 100%) and maintained for 20 minutes at room temperature in a moderately oxidant atmosphere (20% air, 80% argon).

g) Deposition of Activated Pd:Co@$Al_2O_3$ on Cordierite Monoliths for Catalytic Activity Testing The sample prepared at step f) is mixed with ethanol (sample weight relationship: methanol 1:5) in a plastic container. Ceramic balls are added and the container is placed inside a larger container and, then, into a ball mill for milling. After 24 hours of undergoing said process, a semi-liquid mixture is obtained, which is suitable for covering the monoliths. The monolith is submerged in the semi-liquid mixture and the excess is eliminated from the monolith with a compressed air flow. The monolith is, then, dried at 70° C. for 30 min. The immersion and drying procedure is repeated until an increase in weight of approximately 134 mg is achieved. The final phase consists in the calcination of the coated monolith, which is performed with an increasing T ramp of 5° C./min until reaching 400° C., and maintained at said temperature for 4 hours, then, cooled at a room temperature in an inert atmosphere. The coated monolith, obtained in this way, is used in testing.

Example 2

Preparation of Composition 2, Metallic Content 1.8% of the Total Weight a) Reduction of the $Al_2O_3$ Particle Size 13 g of $Al_2O_3$ are suspended in a mixture of toluene (90 ml) and n-octane (10 ml) and treated with ultrasound for 24 hours. The treatment is, then, interrupted to allow the $Al_2O_3$ precipitation in 4-5 hours, the supernatant is decanted and the residue is dried at 80° C. high vacuum for 18 hours and placed in an argon atmosphere.

The subsequent operation must be performed in an Ar using the "Schlenk"-type techniques.

b) Synthesis of Co(0) Nanoparticles on an $Al_2O_3$ Support (Co@$Al_2O_3$)

The $Al_2O_3$ obtained at step a), dried and under argon, is placed in a 250 ml three-necked flask equipped with a mechanical stirrer (not magnetic) and a reflux condenser. $Co_2(CO)_8$ (0.4 g) and toluene (150 ml) are added to the $Al_2O_3$ and the mixture undergoes vigorous stirring for 2 hours. $Al(C_8H_{17})_3$ (0.12 ml) is, then, added to the reaction mixture at room temperature and the mixture is heated under constant reflux conditions for 20 hours at 110° C. under stirring. During the first hour the suspension gradually becomes dark green in colour and at the end, a greyish-black powder is obtained). Afterwards, the particles obtained in this way are left to deposit (1 hour), then, the clear supernatant solution is carefully removed without leading to dryness.

c) Synthesis of Pd(0) Nanoparticles Suspended in an Organic Solvent

In a 250 ml two-necked flask equipped with a dropping funnel, Pd(acac)$_2$ (0.26 g) is suspended in toluene (50 ml). A suspension of $Al(C_8H_{17})_3$ (1.6 ml) in 20 ml of toluene is dropped into a suspension being vigorously stirred (it is possible to apply magnetic stirring). The yellow suspension is immediately transformed into a Pd(0) colloidal solution that is brown-black in colour.

d) Deposition of a Layer of Pd(0) on a Co@$Al_2O_3$ (Pd:Co@$Al_2O_3$)

The colloidal Pd(0) solution, obtained at step c) is added to the particles obtained at step b) and stirred for 3 hours, then, the toluene is removed further to evaporation under high vacuum. in $Al_2O_3$ support there are 0.14 g of Co and 0.09 g of Pd.

The resulting, dark brown powder is washed with acetone (technical purity, 100 ml at a time) 3 times (acetone is added to the powder, shaken for 1 minute and, after the particulate precipitation, the brownish supernatant is sucked outside). The residue is vacuum dried in preparation for the conditioning phase and subsequent heat treatment.

e) Conditioning Pd:Co@$Al_2O_3$

The brown powder obtained during phase d) is placed in a porcelain boat and placed at 350° C. in a pre-heated oven. Initially, the material is conditioned under an argon flow (20 min), then under a hydrogen flow (1 h), then, once again, under an argon flow (20 min). At the end, the container with the sample is removed from the oven (still under the argon flow) and gradually cooled at a temperature of between 20-25° C.

Important: the sample is stabilised against oxidative corrosion in an argon flow that contains a small quantity of oxygen/argon (3.5 vol % $O_2$ in argon) for 20 min at a temperature of between 20-25° C. before exposure to the air. The sample is, then, removed from the container, under an argon flow, to a sealed container and sealed under argon (this operation can be performed in a glove box).

f) Catalytic Activation of Pd:Co@$Al_2O_3$

The sample prepared at step e) (3 g) is heated quickly (10° C./min) at 600° C. in an inert atmosphere (argon). The sample is maintained at said temperature for 2 hours in a controlled atmosphere flow (180 ml/min with 90% argon and 10% hydrogen). After the heat treatment, the sample is cooled slowly in an inert atmosphere (argon 100%) and maintained for 20 minutes at room temperature in a moderately oxidising atmosphere (20% air, 80% argon).

g) Deposition of Activated Pd:Co@Al$_2$O$_3$ on Cordierite Monoliths for Catalytic Activity Testing The sample prepared at step f) is mixed in ethanol (sample weight relationship: methanol 1:5) in a plastic container. Ceramic balls are added and the container is placed inside a larger sized container and, then, in a ball mill for milling. After 24 hours from beginning said process, a semi-liquid mixture is obtained that is suitable to cover the monoliths. The monolith is submerged in the semi-liquid mixture and the excess is eliminated from the monolith with a compressed air flow. The monolith is, then, dried at 70° C. for 30 min. The immersion and drying procedure is repeated until a weight increase of approximately 134 mg is achieved. The final phase consists in the calcination of the coated monolith that is performed with an increasing T ramp of 5° C./min until 400° C., and maintained at said temperature for 4 hours, then, cooled at room temperature in an inert atmosphere. The coated monolith, obtained in this way, is used in testing.

Example 3

Preparation of Composition 3, Metallic Content 10% of the Total Weight a) Reduction of the Size of the Al$_2$O$_2$Particles 6 g of Al$_2$O$_3$ are suspended in a mixture of toluene (90 ml) and n-octane (10 ml) and treated with ultrasound for 24 ore. The treatment is, then, interrupted to allow the Al$_2$O$_3$ precipitation in 4-5 hours, the supernatant is decanted and the residue dried at 80° C. under high vacuum for 18 hours and placed in an argon atmosphere (the subsequent operations must be performed in an Ar atmosphere, using the "Schlenk"-type techniques).

b) Synthesis of Co Nanoparticles on an Al$_3$O$_3$ Support (Co@Al$_2$O$_3$)

The Al$_2$O$_3$ obtained in phase a), dried and under argon, is placed in a 250 ml three-necked flask equipped with a mechanical stirrer (not magnetic) and a reflux condenser. Co$_2$(CO)$_8$ (1.0 g) and toluene (100 ml) are added to the Al$_2$O$_3$ and the mixture undergoes vigorous stirring for 2 hours. Al(C$_8$H$_{17}$)$_3$ (0.30 ml) is, then, added to the reaction mixture at room temperature and the mixture is heated under constant reflux conditions for 20 hours at 110° C. (during the first hour, the suspension being stirred gradually becomes dark green in colour. At the end, a greyish-black powder is obtained). Afterwards, the particles obtained in this way are left to deposit (1 h), then, the clear, supernatant solution is carefully removed without leading to dryness.

c) Synthesis of Pd(0) Nanoparticles Suspended in an Organic Solution

In a 250 ml two-necked flask equipped with a dropping funnel Pd(acac)$_2$ (0.90 g) is suspended in toluene (100 ml). A suspension of Al(C$_8$H$_{17}$)$_3$ (3.9 ml) in 50 ml of toluene is dropped into a suspension being vigorously stirred (it is possible to apply magnetic stirring). The yellow suspension is immediately transformed into a Pd(0) colloidal solution that is brown-black in colour.

d) Deposition of a Layer of Pd(0) on Co@Al$_2$O$_3$

The Pd(0) colloidal solution obtained at phase c), is added to the particles obtained during phase b) and stirred for 3 hours, then the toluene is removed further to evaporation under high vacuum.

The resulting, dark brown powder is washed with acetone (technical purity, 100 ml at a time) 5 times (acetone is added to the powder, stirred for 1 minute and, after the particulate's precipitation, the brownish supernatant is sucked outside). The residue is vacuum dried in preparation for the conditioning phase and subsequent heat treatment; in Al$_2$O$_3$ support there are 0.34 g of Co and 0.31 g of Pd.

e) Conditioning of Pd:Co@Al$_2$O$_3$

The brown powder obtained at step d) is placed in a porcelain boat and placed at 350° C. in a pre-heated oven. Initially, the material is conditioned under an argon flow (20 mins), then, under a hydrogen flow (1 hour), then, once again, under an argon flow (20 min).

At the end, the container with the sample is removed from the oven (still under the argon flow) and gradually cooled at a temperature of between 20-25° C.

Important: the sample is stabilised against oxidative corrosion under an argon flow that contains a small quantity of oxygen/argon (3.5 vol % O$_2$ in argon) for 20 min at a temperature of between 20-25° C. before exposure to the air. The sample is, then, removed from the container, under an argon flow, to a sealed container and sealed under argon (this operation can be performed in a glove box).

f) Catalytic Activation of Pd:Co@Al$_2$O$_3$

The sample prepared at phase e) (3 g) is heated rapidly (10° C./min) at 700° C. in an inert atmosphere (argon). The sample is maintained at said temperature for 2 hours under a controlled atmosphere flow (180 ml/min with 90% argon and 10% hydrogen). After the heat treatment, the sample is cooled slowly in an inert atmosphere (argon 100%) and maintained for 20 minutes at room temperature in a moderately oxidising atmosphere (20% air, 80% argon).

g) Deposition of Activated Pd:Co@Al$_2$O$_3$ on Cordierite Monoliths for Catalytic Activity Testing The sample prepared at phase f) is mixed in ethanol (sample weight relationship: methanol 1:5) in a plastic container. Ceramic balls are added and the container is placed inside a larger sized container and, then, in a ball mill for milling. After 24 hours from beginning said process, a semi-liquid mixture is obtained that is suitable to cover the monoliths. The monolith is submerged in the semi-liquid mixture and the excess is eliminated from the monolith with a compressed air flow. The monolith is, then, dried at 70° C. for 30 min. The immersion and drying procedure is repeated until a weight increase of approximately 134 mg is obtained. The final phase consists in the calcination of the coated monolith which is performed with an increasing T ramp of 5° C./min until 400° C., and maintained at said temperature for 4 hours, then, cooled at room temperature in an inert atmosphere. The coated monolith, obtained in this way, is used in the experimental testing.

Characterization of the Pd:Co@Inert Material Compositions Obtained

The characteristics of the particles obtained at the end of the step of catalytic activation were analysed by Transmission Electron Microscopy and EDX techniques.

The size of the nanoparticles obtained by TEM is reported in FIG. 1 and in table 1 are summarized the atomic ratio α=Co(K)/Pd(L) of the EDX analysis obtained by focusing the electron beam on different alumina flakes.

TABLE 1

| Flake | Co/Pd |
|---|---|
| 1 | 1.9 |
| 2 | 2.32 |
| 3 | 1.92 |
| 4 | 1.65 |
| 5 | 1.62 |
| 6 | 1.85 |
| 7 | 1.94 |

As can be seen from the table 1 the average atomic ratio is Co/Pd=1.9 (s.d. 0.6) in agreement with the nominal value of 2.

Test Conditions of the Catalytic Activity

The typical reaction conditions in which the catalytic testing were carried out were as follows:
1) $O_2/CO=0.44$;
2) feed: $[CO]=0.34\%$; $[O_2]=0.15\%$; $[H_2]=2.00\%$ and $[He]=97.51\%$;
3) flow speed=532 ml/min;
4) catalyst weight=approximately 134 mg of $Al_2O_3$ powder on the monolith (immersion coating);
5) metal content=1.8%, resulting in 2.45 mg $Co_2$:Pd Reaction products have been measured with a mass spectrometer Hiden, paying particular attention to methane traces.

Results of the Preferential Oxidation Testing

Composition 1 (obtained in example 1 above) was tested many times to check the reproducibility of the results and a slight increase in selectivity was observed.

Below are report the definitions used in what follows:
1) selectivity of $CO_2$, $S(CO_2)$=No. of moles $CO_2^{out}$/2(No. of moles $O_2$−No. of moles $O_2^{out}$);
2) $CO_2$ yield with respect to $O_2$, $R(CO_2, O_2)$=No. of moles $CO_2^{out}$/2 No. of moles $O_2^{in}$;
3) $CO_2$ yield with respect to CO, $R(CO_2, CO)$=No. of moles $CO_2^{out}$/No. of moles $CO^{in}$;
4) conversion of $O_2$, $C(O_2)$=(No. of moles $O_2^{in}$−No. of moles $O_2^{out}$)/No. of moles $O_2^{in}$;
5) conversion of CO, $C(CO)$=(No. of moles $CO^{in}$−No. of moles $CO^{out}$)/No. of moles $CO^{in}$.

As a consequence, $R(CO_2, O_2)=S(CO_2).C(O_2)$.

Figure 2:
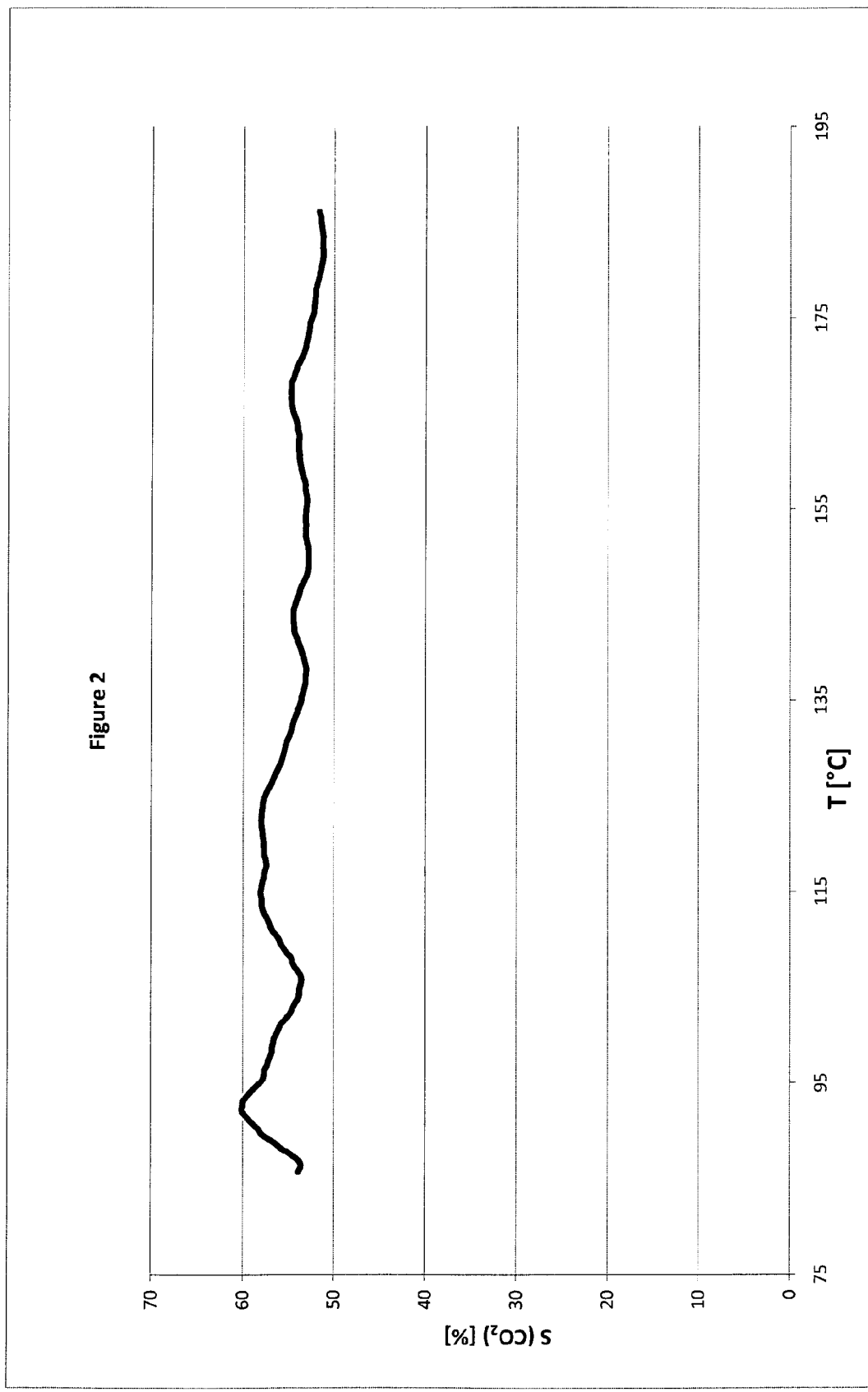
FIG. 2. the figure shows the results obtained with the composition 1 prepared in example 1 according to the method of the invention on the selectivity of $CO_2$, $S(CO_2)$=No. of moles $CO_2^{out}/2$(No. of moles $O_2^{in}$–No. of moles $O_2^{out}$).

After some test cycles, the catalytic activity stabilised itself along the line $S(CO_2)$ set forth in FIG. 2, where it can be seen that composition 1 (obtained in the aforementioned example 1) has a very constant selectivity above 80° C. of about 55%.

Figure 3:
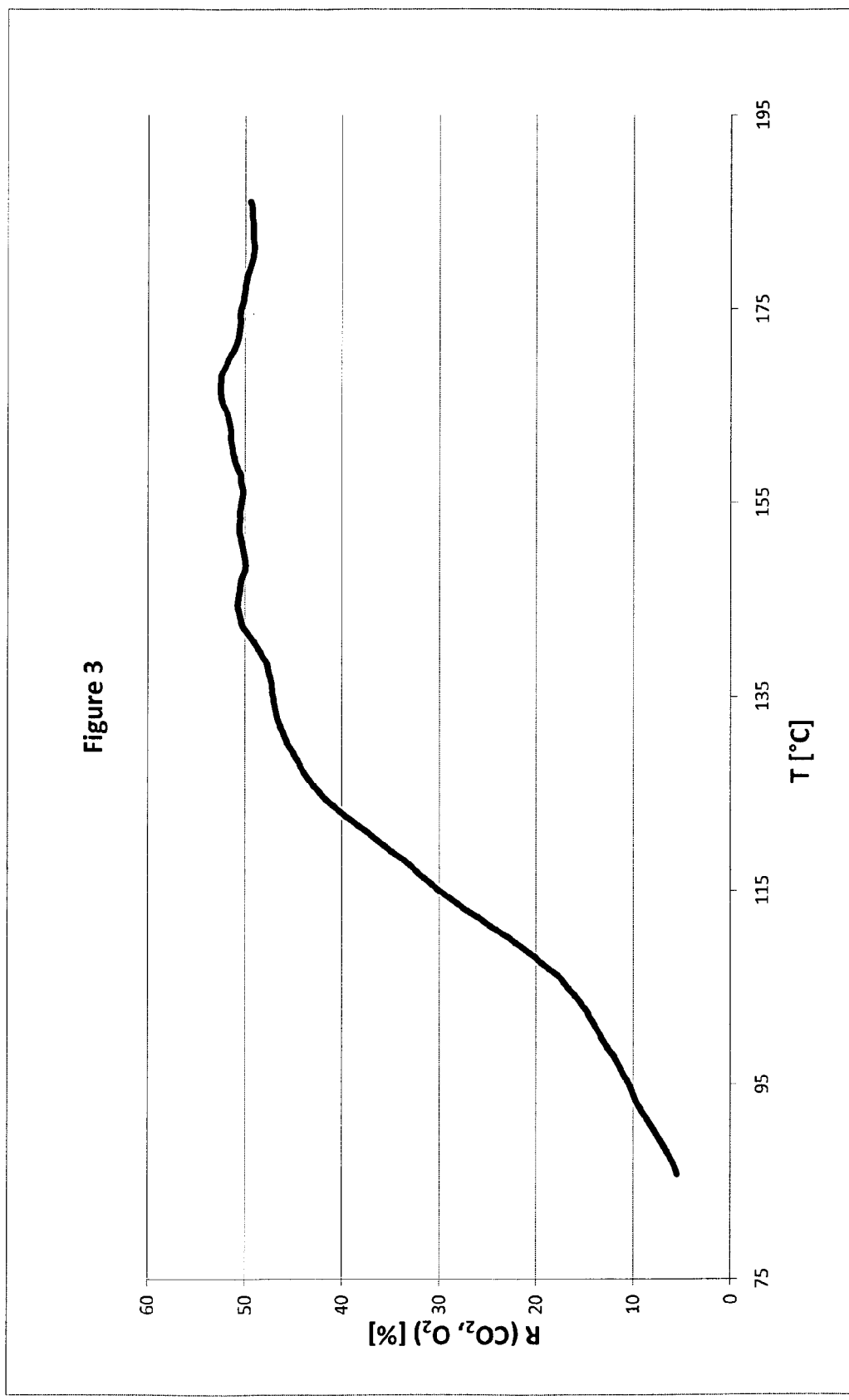
FIG. 3. the figure shows the results obtained with the composition 1 prepared in example 1 according to the method of the invention on $CO_2$ yield with respect to $O_2$, $R(CO_2, O_2)$=No. of moles $CO_2^{out}/2$ No. of moles $O_2^{in}$.

It has also set out $CO_2$ yield of the composition 1 with respect to $O_2$, $R(CO_2,O_2)$; the results obtained are reported in FIG. 3 (obtained in example 1, described above), from which it can be seen that already at 140° C. a yield of 50% is obtained.

The reference, palladium catalyst (1.8% metallic content) was tested several times. The testing confirmed the tendency of Pd to improve performances further to repeated testing. In spite of this, Pd is not considered as being a good catalyst because, generally, the required temperature is relatively high compared to composition 1 (obtained in example 1, described above) and because of its tendency to oxidise.

A test with a reference palladium catalyst, pre-treated under reducing conditions (the same treatment undergone by the composition 1), was conducted. In this case, a drastic reduction of $CO_2$ selectivity and $CO_2$ yield with respect to $O_2$ was recorded.

$CO_2$ yield with respect to $O_2$, $R(CO_2, O_2)$, of composition 1 prepared according to the method of the invention and of Pt and Pd reference catalyst are reported in FIG. 3. The composition 1 has a $CO_2$ yield with respect to $O_2$, $R(CO_2, O_2)$, higher compared to the $CO_2$ yield of Pt reference catalyst at a much lower operating temperatures.

Figure 4:
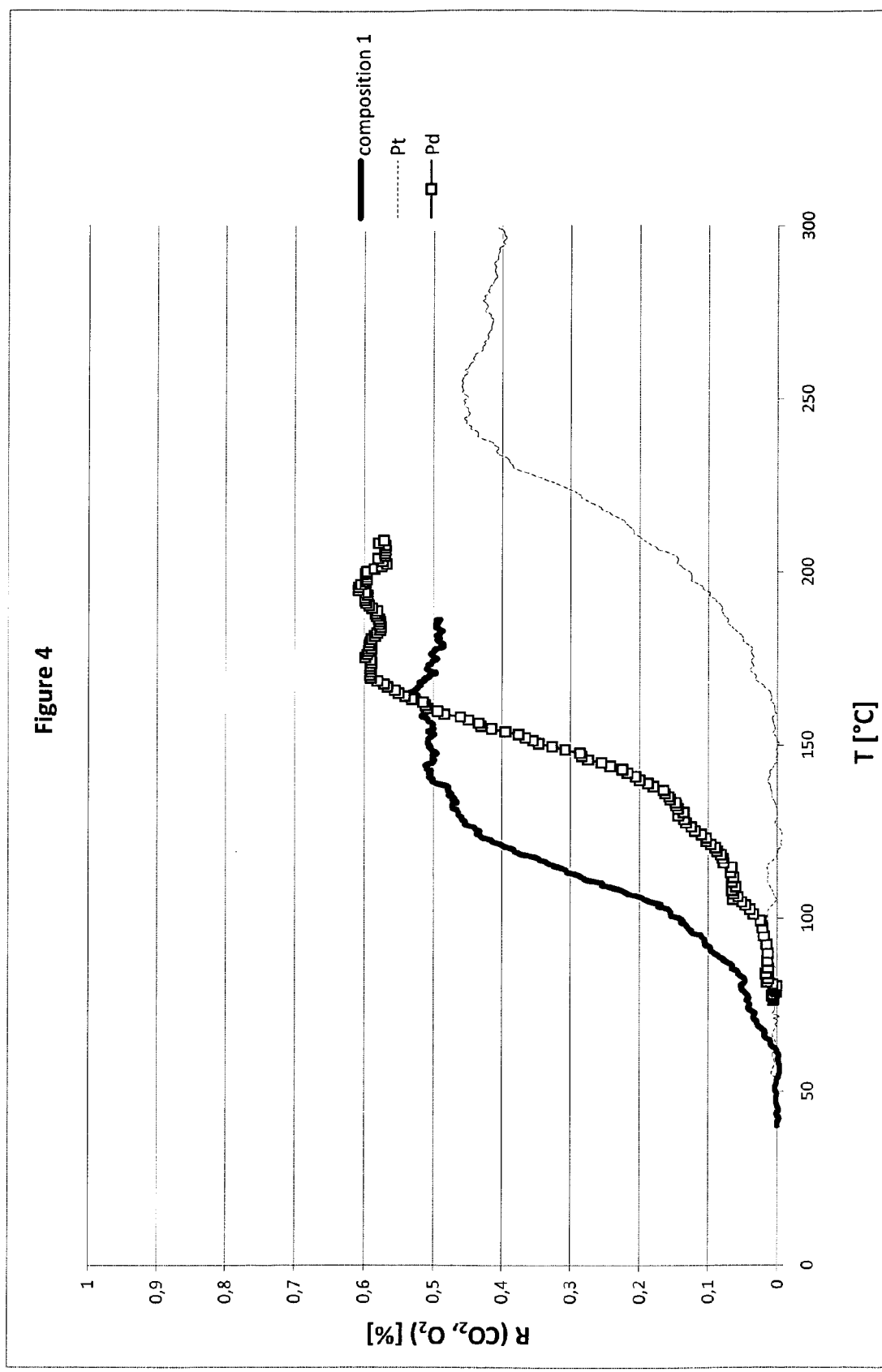
FIG. 4. the figure shows the results obtained from the comparison of the composition 1 prepared in example 1 according to the method of the invention and reference catalysts of Pt and Pd on $CO_2$ yield with respect to $O_2$, $R(CO_2, O_2)$=No. of moles $CO_2^{out}/2$ No. of moles $O_2^{in}$.

It should be noted that, from the temperature at which all oxygen is completely reduced, $CO_2$ yield with respect to $O_2$, $R(CO_2, O_2)$, coincides with $CO_2$ selectivity, $S(CO_2)$. As a consequence, maximum selectivity can be inferred from FIG. 4 and it is reported in the following table 2.

TABLE 2

| Sample | Composition 1 (Ex 1) | Pd reference catalyst | Pt reference catalyst |
|---|---|---|---|
| $S(CO_2)_{max}$ | 55% | 60% | 45% |
| T | 150° C. | 190° C. | 250° C. |

Figure 5:
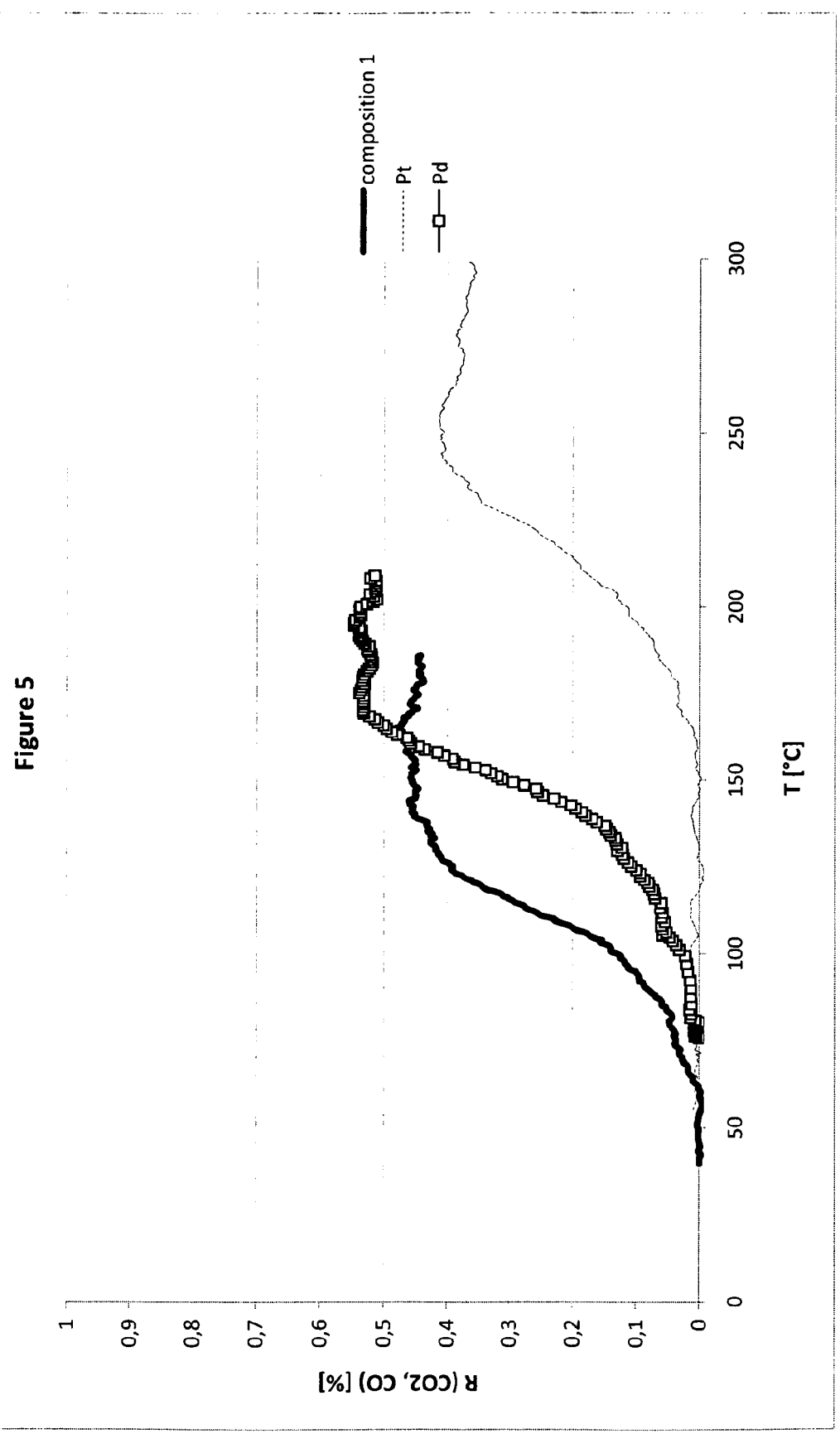
FIG. 5. the figure shows the from the comparison of the composition 1 prepared in example 1 according to the method of the invention and reference catalysts of Pt and Pd on $CO_2$ yield with respect to CO, $R(CO_2, CO)$=No. of moles $CO_2^{out}/$ No. of moles $CO^{in}$.

For the sake of completeness, a comparison from the yields in $CO_2$ respect to CO is reported in FIG. 5, in which a comparison between $CO_2$ yield with respect to CO, $R(CO_2, CO)$, of composition 1 of this invention, Pt reference catalyst and Pd reference catalyst is made.

Example of comparison with the commercial, Engelhard Selectoxo® catalyst (ref. *J. of Power Source*, 2004, 129, 246).

The reaction conditions in which the catalytic testing was performed are as follows (set forth in the reference article):

$O_2/CO=0.6$; (feed: $[CO]=2.8\%$; $[O_2]=1.6\%$; $[H_2]=72\%$). Please note that $O_2/CO=0.6$ ratio is comparable with $O_2/CO$ ratio used for testing composition 1 of this invention.

Flow speed=167 ml/min. Please note that flow speed is much lower compared with flow speed used for testing composition 1 of this invention.

Catalyst weight=approximately 500 mg of $Al_2O_3$ powder on the monolith (immersion coating);

Metal content=0.5% Pt and 0.02%Fe, resulting in 2.50 mg Pt. Please note that metal content is comparable with metal content of composition 1 of this invention.

result 1=maximum CO conversion=50% at 220° C.

result 2=maximum $CO_2$ selectivity=55% at 220° C.

Because, apart from $CO_2$ and $H_2O$, composition 1 does not yield secondary products, No. of moles $CO^{in}$−No. of moles $CO^{out}$=No. of moles $CO_2^{out}$ and, as a consequence, $R(CO_2, CO)=C(CO)$. Therefore, $R(CO_2, CO)$ of composition 1 can be compared with $C(CO)$ of Selectoxo reported in the quoted article.

With respect to the commercial catalyst, composition 1 reaches a comparable yield $R(CO_2, CO)$ (about 50%), but at a much lower temperature (150° C. instead of 220° C.). With respect to the commercial catalyst, composition 1 reaches a comparable selectivity of $CO_2$, $S(CO_2)$ (about 55%), but at a much lower temperature (90° C. instead of 220° C.).

The invention claimed is:

1. A method for preparation of a composition of cobalt and palladium nanoparticles supported on an inert material particles comprising at least the steps of:

reducing a cobalt compound and depositing Co(0) metallic nanoparticles obtained on the surface of particles consisting of an inert material, selected from aluminium oxide, titanium oxide, zirconium oxide, silicon oxide, cerium oxide and mixed cerium and zirconium oxides by adding the Co compound in an organic solvent to said particles of inert material and treating with a chemical reducing agent selected from trialkyl-aluminium $AlR_3$, where R is a $C_6$-$C_{20}$ alkyl linear or branched chain, under argon flux;

preparing a colloidal suspension of Pd(0) nanoparticles by treating a Pd(II) compound in an organic solvent with a chemical reducing agent selected from a trialkyl-aluminium compound $AlR_3$, where R is a $C_6$-$C_{20}$ alkyl linear or branched chain, under argon flux;

depositing the Pd(0) nanoparticles on the Co(0) nanoparticles supported on the inert material particles composition obtained at the previous step under argon flux;

exposing a dry powder of the composition of Pd(0):Co(0) nanoparticles supported on the inert material particles obtained at the previous step under fluxes in sequence of argon, hydrogen and argon; and subjecting to a catalytic activation the Pd:Co nanoparticles supported on the inert material particles composition obtained from the step of conditioning.

2. The method according to claim 1, further comprising the steps of:

stabilising Pd:Co nanoparticles supported on the inert material particles composition obtained from the step of conditioning by superficial oxidation.

3. The method according to claim 1, wherein the step of Co reduction to Co(0) nanoparticles and deposition thereof consists of a decomposition of a Co compound, where the metals Co and Al of the trialkyl-aluminium compound $AlR_3$ are in an atomic ratio Co:Al comprised from 2 to 20 and the metals Co and the metal of the inert material selected particles are in the ratio by weight of at least 0.02, at a temperature comprised from 80 to 180° C. for a time from 0 to 24 hours.

4. The method according to claim 3, wherein the ratio by weight between the Co nanoparticles and the metal of which the inert material particles is comprised in the range from 0.02 to 0.20.

5. The method according to claim 1, wherein the colloidal suspension of Pd(0) nanoparticles is prepared by treating a Pd(II) compound in an atomic ratio Pd:Al of trialkyl-aluminium compound $AlR_3$ comprised from 0.1 to 3.0 at a temperature comprised from 20 to 200° C.

6. The method according to claim 1, wherein the step of Pd(0) nanoparticles deposition on the Co(0) nanoparticles supported on the inert material particles composition is performed by adding the Pd(0) nanoparticles suspended in the organic solvent to said Co(0) nanoparticles supported on the inert material particles composition in powder under stirring at room temperature for at least 3 hours, wherein the two metals are in an atomic ratio Pd:Co in the range from 1:10 to 1:0.1.

7. The method according to claim 6, wherein the two metals are in an atomic ratio Pd:Co in the range from 1:3 to 1:1.

8. The method according to claim 1, wherein the organic solvent of the steps of reduction of Co and Pd is selected from the group consisting of benzene, xylene, toluene and mixtures thereof.

9. The method according to claim 1, wherein the conditioning is obtained by treating the dry powder at a temperature in the range from 250 to 450° C. under a hydrogen flow for at least 1 hours, wherein said hydrogen flow is preceded and followed by argon fluxes for at least 20 min.

10. The method according to claim 1, wherein the inert material used as support is subjected to a calcination and size reduction to obtain a material having a surface area BET>100 $m^2/g$; a total pore volume>0.8 $cm^3/g$; an average pore diameter>200 Angstrom and a size of at least from 20 nm to 500 nm.

11. The method according to claim 1, wherein the catalytic activation of the conditioned Pd:Co nanoparticles supported on the inert material particles composition is obtained by annealing at a temperature comprised from 500 to 1000° C. in an atmosphere consisting of a mixture of hydrogen and argon in a ratio by volume from 1 to 20% of hydrogen and from 99 to 80% of argon for a time comprised from 1 to 6 hours.

12. The method according to claim 2, wherein the stabilization by superficial oxidation is obtained by treating the conditioned Pd:Co nanoparticles supported on inert material particles composition with 3.5% by volume $O_2$ in argon for 20 min. at room temperature.

* * * * *